(12) United States Patent
Biehl et al.

(10) Patent No.: US 8,869,633 B2
(45) Date of Patent: Oct. 28, 2014

(54) BEARING DEVICE HAVING A SENSOR FOR MEASURING THE VERTICAL BEARING FORCE OF A ROTATING SHAFT

(75) Inventors: Saskia Biehl, Braunschweig (DE); Bernd Lüneburg, Mülheim an der Ruhr (DE)

(73) Assignees: Siemens Aktiengesellschaft, Munich (DE); Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 288 days.

(21) Appl. No.: 13/512,042

(22) PCT Filed: Nov. 19, 2010

(86) PCT No.: PCT/EP2010/067798
§ 371 (c)(1),
(2), (4) Date: Sep. 5, 2012

(87) PCT Pub. No.: WO2011/064144
PCT Pub. Date: Jun. 3, 2011

(65) Prior Publication Data
US 2012/0318071 A1    Dec. 20, 2012

(30) Foreign Application Priority Data

Nov. 27, 2009 (EP) .................................... 09014802

(51) Int. Cl.
| | |
|---|---|
| *G01L 1/00* | (2006.01) |
| *G01L 1/22* | (2006.01) |
| *G01L 5/00* | (2006.01) |
| *F16C 35/00* | (2006.01) |
| *F16C 19/52* | (2006.01) |
| *G01L 1/18* | (2006.01) |
| *G01L 1/20* | (2006.01) |

(52) U.S. Cl.
CPC ................. *G01L 1/18* (2013.01); *G01L 5/0019* (2013.01); *F16C 35/00* (2013.01); *F16C 19/52* (2013.01); *G01L 5/0009* (2013.01); *G01L 1/20* (2013.01)
USPC ............ 73/862.627; 73/862.473; 73/862.474; 73/862.625

(58) Field of Classification Search
CPC ........... G01L 1/18; G01L 5/0009; G01L 1/20; G01L 5/0019; F16C 35/00; F16C 19/52
USPC ...................... 73/862.451, 862.471–862.474, 73/862.621, 862.625, 862.627
See application file for complete search history.

(56) References Cited

U.S. PATENT DOCUMENTS 4,830,399 A * 5/1989 Hafner ...................... 280/5.501
5,513,536 A    5/1996 Braun et al.
(Continued)

FOREIGN PATENT DOCUMENTS

| CN | 1611925 A | 5/2005 |
|---|---|---|
| DE | 2809438 A1 | 9/1979 |

(Continued)

*Primary Examiner* — Lisa Caputo
*Assistant Examiner* — Jonathan Dunlap

(57) ABSTRACT

A bearing device for bearing a shaft having a bearing, a supporting structure for supporting the bearing and at least on piezoresistive sensor incorporated in the supporting structure in an integrated manner which is arranged in the flux region of the bearing apparatus is provided. The electrical resistance of the sensor is influenced by the vertical force of the bearing having effect on the sensor such that the vertical force of the bearing may be electrically tapped on the sensor. A corresponding method for determining the static and/or dynamic vertical bearing forces of the shaft bearing of a shaft and a rotor system for determining the vertical bearing force of a shaft bearing are provided.

14 Claims, 3 Drawing Sheets

(56) References Cited

U.S. PATENT DOCUMENTS

| | | | |
|---|---|---|---|
| 7,827,871 B2 * | 11/2010 | Ehrfeld et al. | 73/862.322 |
| 8,308,369 B2 * | 11/2012 | Guillaume et al. | 384/448 |
| 8,313,240 B2 * | 11/2012 | Giordana | 384/448 |
| 2002/0061148 A1 | 5/2002 | Blanchin et al. | |
| 2003/0089177 A1 | 5/2003 | Brand et al. | |
| 2009/0180722 A1 | 7/2009 | Dougherty | |
| 2012/0090409 A1 | 4/2012 | Luthje et al. | |

FOREIGN PATENT DOCUMENTS

| | | |
|---|---|---|
| DE | 102006019942 A1 | 10/2007 |
| EP | 1528382 A1 | 5/2005 |
| FR | 2862089 A1 | 5/2005 |
| FR | 2932542 A1 | 12/2009 |
| JP | 7190865 | 10/1994 |
| JP | 2004517483 A | 6/2004 |
| JP | 2005134377 A | 5/2005 |

* cited by examiner

BEARING DEVICE HAVING A SENSOR FOR MEASURING THE VERTICAL BEARING FORCE OF A ROTATING SHAFT

CROSS REFERENCE TO RELATED APPLICATIONS

This application is the US National Stage of International Application No. PCT/EP2010/067798, filed Nov. 19, 2010 and claims the benefit thereof. The International Application claims the benefits of European Patent Office application No. 09014802.4 EP filed Nov. 27, 2009. All of the applications are incorporated by reference herein in their entirety.

FIELD OF INVENTION

The invention relates to a bearing device having a sensor for measurement of the bearing contact force of a rotating shaft. In particular, the invention relates to a bearing device having a sensor by means of which the contact force of the bearing can be tapped off electrically. Furthermore, the invention relates to a rotor system having a bearing device which has the sensor. In addition, the invention relates to a corresponding method for determination of the static and/or dynamic bearing contact forces of the shaft, to a corresponding control system, and to the use of the sensor for determination of the bearing contact force of a shaft bearing.

BACKGROUND OF INVENTION

A rotor system with multiple bearings is simply or multiply statically over-defined. This means that a change in the geometric position of a bearing relative to the shaft (or vice versa)—referred to in the following text as the alignment—results in a change in the bearing contact forces. Depending on the geometric configuration of the shaft and bearing system, even minor alignment changes result in major force changes on the bearings, and in consequence also in major changes to the bending stresses in the shaft system. Because of the load-dependent dynamic characteristics of journal bearings, the dynamic characteristics of a rotor system such as this likewise change with the contact force distribution.

Conversely, the knowledge of the static contact forces of the rotor system with multiple bearings allows assessment of the alignment of the bearings relative to the shaft system. The knowledge of the dynamic contact forces allows assessment of the oscillation state of the rotor system with multiple bearings.

Alignment errors can lead to increased bending stress loads on the shaft, and to excessive oscillations and bearing damage. High dynamic contact forces can likewise lead to bearing damage or consequential damage to adjacent or connected components, such as oil lines. The maximum permissible oscillation intensity is frequently specified by an operator. One feature of the static and dynamic contact forces is that they can vary during operation, both in the short term and in the long term. Short-term changes are caused by heating-up processes and load changes, for example. Long-term changes are caused by creepage deformation and seating phenomena, for example. Furthermore, changes in the static contact forces cannot be identified directly, since they become evident by different, often ambiguous changes in the operating behavior. The dynamic contact forces are generally determined by oscillation measurements, although the quantitative assessment thereof is feasible only if the system stiffnesses are known at the same time, and is therefore subject to considerable uncertainties.

Until now, the static bearing contact forces and the shaft alignment relative to the bearings have been determined by coupling the couplings to one another with no or with only a limited setting error. However, the changes during operation are not recorded directly in this way. In fact, indirect measurements, such as bearing temperature measurements, raised oil pressures and oscillations are measured, which allow an indirect conclusion to be drawn about the possible changes during operation in the shaft alignment relative to the bearings. During shut down periods, couplings are "broken", and the alignment is determined by measurement of the coupling position error. Movement measurements carried out during operation on machine foundations and on stationary components likewise provide an indication of unacceptably major changes in the bearing contact forces which occur in the long term and short term.

The dynamic bearing contact faces are determined by oscillation measurements. Both relative and absolute oscillation measurements are carried out for this purpose. In the case of a relative oscillation measurement, the oscillation of the shaft is generally measured relative to the movement of a pick-up. The pick-up is attached to the bearing or to the bearing housing. In the case of an absolute oscillation measurement, the absolute movement is measured in three dimensions. In this case, the transmitter, that is to say a sensor or a measurement probe for determination of the absolute movement, is generally attached to the bearing or to the bearing housing. Estimates relating to contact estimates can be made by means of these measurements and further assumptions relating to the stiffness of the support.

However, the methods mentioned above have the common feature that, in some cases, they are subject to considerable uncertainties and provide only estimates of the bearing contact force to be determined.

FR 2 862 089 A1 describes a bearing having a sensor.

SUMMARY OF INVENTION

One object of the invention is to provide a bearing device, a rotor system with the bearing devices, and a method for measurement of static and dynamic bearing contact forces in the bearing device, which allow the static and dynamic bearing contact forces to be determined accurately.

This object is achieved by a bearing device as described in the claims, and by a rotor system, a method for determination of the bearing contact force and the use of a sensor as claimed in the other independent claims.

According to the claims, a bearing device is provided for bearing a shaft, with the bearing device having a bearing, a supporting structure for supporting the bearing, and at least one piezoresistive sensor which is incorporated in an integrated manner into the supporting structure and is arranged in the power flow area of the bearing device. The contact force of the bearing, which acts on the sensor, influences the electrical resistance of the sensor such that the contact force of the bearing can be tapped off electrically at the sensor.

The bearing device according to the invention has the advantage that the contact force of the bearing can be determined by direct measurement. In particular, this is because the sensor is incorporated in an integrated manner in the power flow into the supporting structure, and the contact force to be measured therefore acts directly on the sensor and this sensor in turn makes it possible to electrically tap off the force acting thereon, in accordance with the pressure-dependent resistance characteristics thereof, because the electrical resistance behavior thereof is dependent on the pressure.

In the case of piezoresistive sensors, that is to say in the case of sensors having a pressure-dependent electrical resistance behavior, no deformation or only minor deformation occurs, for example in the nanometer range, when force acts on the sensor. At the same time, when force acts on the sensor, a measurable change is already produced in the electrical resistance as a result of a change in the pressure in the sensor material.

This means inter alia that, as one advantage of the invention, the sensor carries out the function of a load-bearing part in the bearing device, in the power flow area within the supporting structure. The sensor is arranged in the power flow area. In the case of the bearing device according to the invention, there is no reduction in the structural integrity as a result of the provision of the sensor, since the sensor is arranged integrated in the supporting structure.

Advantageously, both the static and the dynamic bearing contact forces can be determined directly with the bearing device according to the invention. In comparison to an indirect measurement, this results in a reduction in the uncertainties and estimation errors, particularly in addition within the oscillation diagnosis. In contrast to direct measurement, an indirect measurement therefore generally provides only indications for determination of the bearing contact forces and allows only imprecise statements, since the relationship between the actual bearing contact forces and the measured values provided by the indirect measurement is often known only incompletely.

The measurement can be carried out both during operation of the machine which has the bearing device, and when it is stationary. This is an advantage, in particular over a measurement by means of a strain gauge, because the measurement point has to be deformed when using strain gauges, which would not be practical or feasible when the machine is in operation.

Since the invention is based on an electrical measurement principle, standard evaluation and diagnosis methods can be used. The measurement value can be linked to alarm and warning values, allowing automated monitoring. Long-term evaluation of the static components also allows identification of long-term alignment changes. Furthermore, the solution according to the invention can be used for all machine types and can be implemented easily, since only stationary, non-rotating components are affected. The accuracy of the analysis is considerably enhanced in comparison to all known real-time methods.

According to one development of the invention, the sensor has one or more piezoresistive thin layers. One advantage of the thin layers in the sensor is that the bearing device can be provided with the large-area sensor with little use of material and little volume, with a relatively large area being arranged at right angles to the power flow, thus producing a pressure measurement or contact force measurement which is as sensitive and accurate as possible. However, the invention is not restricted to sensors with thin layers, that is to say to so-called thin-film sensors, and thicker layers may also be used if required, which may also depend in particular on the nature of the sensor material used.

Preferably, the one or more piezoresistive thin layers have a layer of Diamond Like Carbon (DLC), which has amorphous carbon. This results in a high sensor sensitivity. However, the invention is not restricted to DLC as a sensor material, and in particular not to DLC thin-layer sensors. Alternatively, other piezoresistive materials may also be used. For example, silicon may also be used.

Preferably, the sensor has one or more sensor plates or sensor disks, with the piezoresistive thin layers being applied to the sensor plates or to the sensor disks. One advantage of sensor disks or sensor plates is that the piezoresistive sensor can be manufactured with narrow tolerances. For example, a unit comprising a sensor disk and a piezoresistive layer applied thereto can be produced first of all, in which case the surface of the piezoresistive layer can be reworked in order to produce a smooth contact surface. The unit comprising the sensor disk and the piezoresistive layer is introduced into a cutout, which is provided for this purpose, in the supporting structure of the bearing device. Furthermore, according to the invention, the thicknesses of the sensor disks may be chosen such that the piezoresistive sensors in the bearing device are mechanically prestressed. The provision of mechanical prestressing makes it possible to improve the measurement characteristics of the sensor, and, by way of example, linear measurement characteristics can be achieved for the installed sensor.

Preferably, the contact force can be tapped off by means of at least one contact electrode, which rests on the piezoresistive thin layers. One advantage of using a contact electrode for tapping off is that the evaluation of the resistance measurement or of the resistance change which occurs in the piezoresistive sensor can be determined more accurately, since the influence of electric currents, which do not pass through a piezoresistive layer of the sensor, and which "bypass" the piezoresistive layer, is minimized. However, the invention is not restricted to such a contact electrode which makes direct contact. Alternatively, the resistance change in the sensor can also be determined exclusively by means of electrodes which do not rest directly on a piezoresistive layer, for example by providing electrical connections only on the rear faces, that is to say on the non-coated surfaces of the sensor disks. However, as already mentioned, in the case of an alternative embodiment such as this, there is an increased risk of a conductive connection being formed between the electrical connections, corrupting the intended resistance measurement of the piezoelectric layer. In one exemplary embodiment, this problem is solved by integrating the sensor in a cutout with non-conductive surfaces, rather than by providing the contact electrode resting directly thereon.

Preferably, the temperature of the piezoresistive sensor is monitored. The sensor whose temperature is monitored has the advantage that a sensor resistance change caused by a change in the temperature of the bearing device can be compensated for better in an evaluation of the sensor signals. For example, a calibration curve for a sensor can be used for this purpose, this calibration curve indicating the resistance value of the sensor as a function of the sensor temperature for a fixed value of the bearing contact force.

According to the invention, a rotor system having a rotor and a plurality of bearing devices for bearing the rotor shaft of the rotor is also provided, with the rotor shaft being borne in a statically over-defined manner, and with at least one of the bearing devices being one of the bearing devices according to the invention as described above.

Furthermore, a method is provided for determination of the static and/or dynamic bearing contact forces of the shaft bearings of a shaft which is borne in a statically over-defined manner and is borne by means of one or more of the bearing devices according to the invention, in which method the bearing contact force is tapped off electrically by means of at least one of the piezoresistive sensors which is incorporated, such that it is integrated in the power flow area in the supporting structure of one of the shaft bearings. According to one exemplary embodiment of the invention, the method is applied to a rotor system with multiple bearings, having a rotor and a rotor shaft for driving the rotor.

Furthermore, a control system is provided for monitoring the static and/or dynamic bearing contact forces of the shaft bearings of a shaft which is borne such that it is statically over-defined one or more times, with the shaft being borne by means of one or more of the bearing devices according to the invention. The control system has a read unit for reading the signals from at least one piezoresistive sensor, which is incorporated such that it is integrated in the power flow area, in the supporting structure of one of the shaft bearings, and an electronic further-processing unit for calculation of the bearing contact forces from the signals received from the at least one piezoresistive sensor. According to one development of the invention, the control system has an output unit for displaying the calculated bearing contact forces for a user. The control system according to the invention can preferably be coupled to a rotor system with multiple bearings, and is furthermore designed to control the rotation speed of the rotor of a rotor system in response to the bearing contact forces calculated from the sensor signals. According to one development of the invention, the control system according to the invention has an alarm unit for alarming a user and for using the bearing contact forces calculated from the sensor signals to determine whether a critical threshold value of a bearing contact force has been exceeded.

Furthermore, the invention provides for the use of a piezoresistive sensor for determination of the bearing contact forces of a shaft bearing, with the sensor being incorporated in an integrated manner in the supporting structure of a shaft bearing of a bearing device, as has been described above. Preferably, the sensor used has a plurality of sensor plates or sensor disks with at least one layer, which is applied to the sensor plates or disks, composed of amorphous carbon (DLC) and has a contact electrode between the sensor plates or disks for making electrical contact with the at least one layer composed of amorphous carbon.

BRIEF DESCRIPTION OF THE DRAWINGS

One preferred exemplary embodiment of the invention will be explained in the following text with reference to the attached schematic figures, in which.

DETAILED DESCRIPTION OF INVENTION

Figure 1:
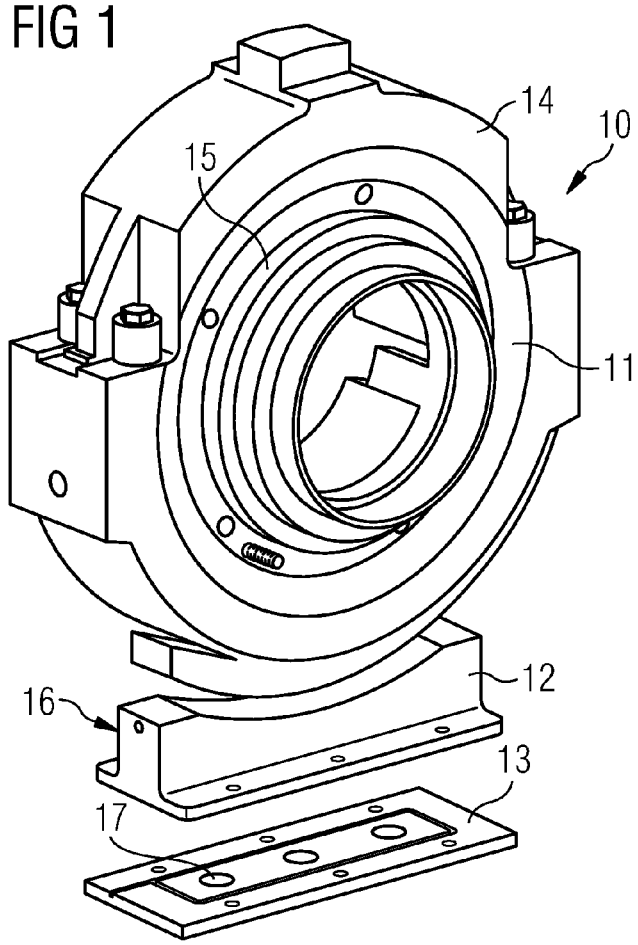
FIG. 1 shows a perspective view of a bearing device according to the exemplary embodiment of the invention.
Figure 2:
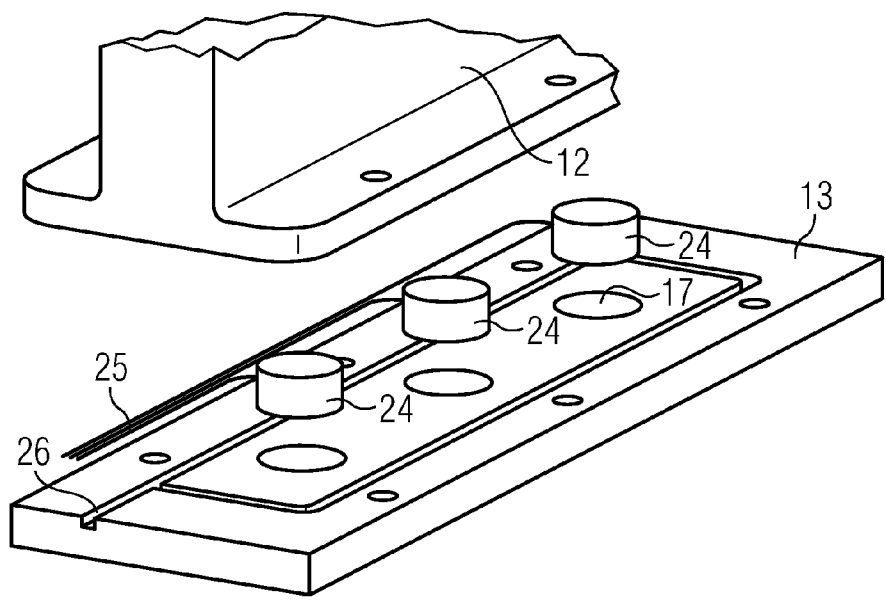
FIG. 2 shows a detailed view of components of the bearing device from the exemplary embodiment of the invention shown in FIG. 1.

The same reference symbols denote elements which are the same in the following description of the figures. By way of example, FIGS. 1 and 2 show the installation of three sensors in a supporting structure of a high-pressure turbine element which is used in a power station. FIG. 1 shows a perspective view of a bearing device 10 according to one exemplary embodiment of the invention. A bearing structure 11 has a bearing 15 which is held in a bearing holder 14. The bearing holder 14 is seated on a holder or bearing stool 12, which is mounted on a stool plate 13. The bearing holder 14, the bearing stool 12 and the stool plate 13 form the supporting structure 16 for the bearing 15 of the bearing device 10. As is shown in FIG. 1, the stool plate 13 contains holes 17, with the holes 17 being intended for piezoresistive sensors 24, in order to introduce the sensors 24 into the supporting structure 16, in this case into the stool plate 13, in an integral manner.

However, the invention is not restricted to the bearing structure 11 shown in FIG. 1 or to a bearing structure having a journal bearing, but can also be applied to any other structure bearing types and bearing structures which are suitable for bearing rotating shafts.

FIG. 2 shows a detail view of components of the bearing device of the exemplary embodiment of the invention described in FIG. 1. According to the exemplary embodiment shown in FIG. 2 and in FIG. 1, the piezoresistive sensors 24 have a cylindrical shape and are introduced with an accurate fit into the holes 17 which are provided in the stool plate 13. In this case, the height of the piezoresistive sensors 24 in comparison to the depth of the holes 17 should be chosen such that, when the supporting structure is assembled, a sufficiently high static pressure is formed in the sensor material. The force which acts on the sensors and acts on the bearing device during operation is preferably set such that this results in sufficiently high mechanical prestressing. As is shown in FIG. 2, the bearing stool 26 has a groove 26 for feeding the lines 25 for the electrical connections to the piezoresistive sensors 24. The lines 25 are used for resistance measurement. In addition, feeds (not shown) can be provided for a temperature measurement.

Since the piezoresistive sensors 24 are fitted integrally into the stool plate 13, they exert a load-bearing function within the supporting structure 16. The supporting structure 16 according to the invention therefore has no significant structural changes or losses in comparison to a conventional supporting structure without integrated sensors, in terms of statics and dynamics since, for example, there are also no additional unfilled cavities which occur in the supporting structure 16 of the assembled bearing device 10.

The shape of the sensors 24 is not restricted to the cylindrical shape shown in FIG. 2. For example, according to another exemplary embodiment, elongated rectangular sensors or sensors in the form of strips are provided, which are incorporated integrally into the supporting structure in the power flow area of the bearing device, at right angles to the power flow direction.

According to the exemplary embodiment in FIGS. 1 and 2, the sensors are completely surrounded in the installed state by the material of the stool plate 13, which makes the arrangement of the sensors highly robust. According to another exemplary embodiment, however, rectangular piezoelectric sensors for determination of the contact force in the edge area of the stool plate are inserted into a hole or a recess in the stool plate, with the edge of the sensors and the edge of the stool plate being aligned flush with one another.

According to yet another exemplary embodiment, the sensors have no sensor disks and the piezoresistive thin layers are applied directly to the stool plate, as a result of which there is no need for deep holes in which sensor disks can be inserted, but flat depressions, at most, are provided, in which the thin layers are arranged. In this case, the thin layers are arranged at right angles to the power flow direction.

Although three sensors 24 are used in the exemplary embodiment shown in FIGS. 1 and 2, it is also possible to use a greater or lesser number of sensors. In another exemplary embodiment, only a single sensor is used, in order to detect whether a power flow threshold value has been critically exceeded. Furthermore, in yet another exemplary embodiment, more than three sensors are provided in order to increase the detection accuracy.

Figure 3:
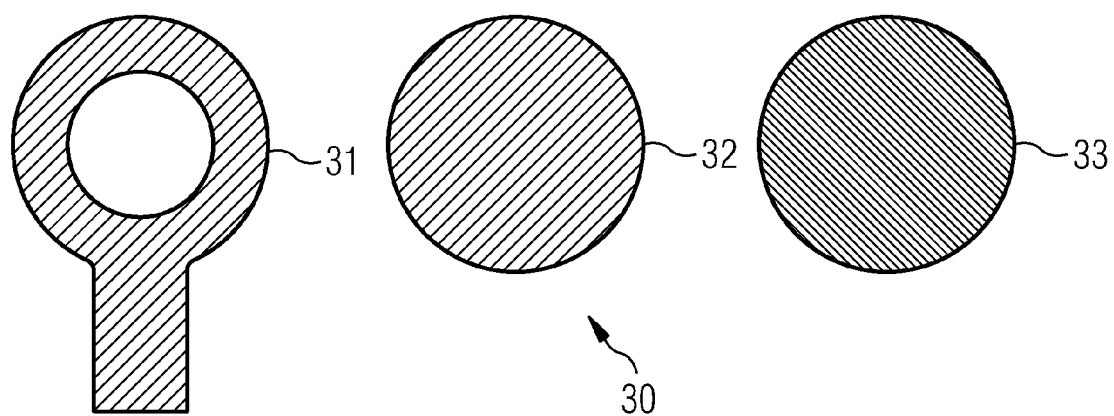
FIG. 3 shows a schematic view of components of a piezoresistive sensor from FIG. 2.

By way of example, FIG. 3 shows a schematic view of components of a piezoresistive sensor 30. The sensor 30 shown in FIG. 3 corresponds to the sensors 24 from FIG. 2, and has circular sensor disks 32, 33. As is indicated by the shaded area in the illustration of the sensor disks 32, 33, the sensor disks 32, 33 are coated with a piezoresistive material, for example with Diamond Like Carbon (DLC). The piezoresistive material makes electrical contact with a contact electrode 31, which is placed between the two sensor disks 32, 33, such that the contact electrode touches the piezoresistive material on the sensor disks 32, 33.

Figure 4:
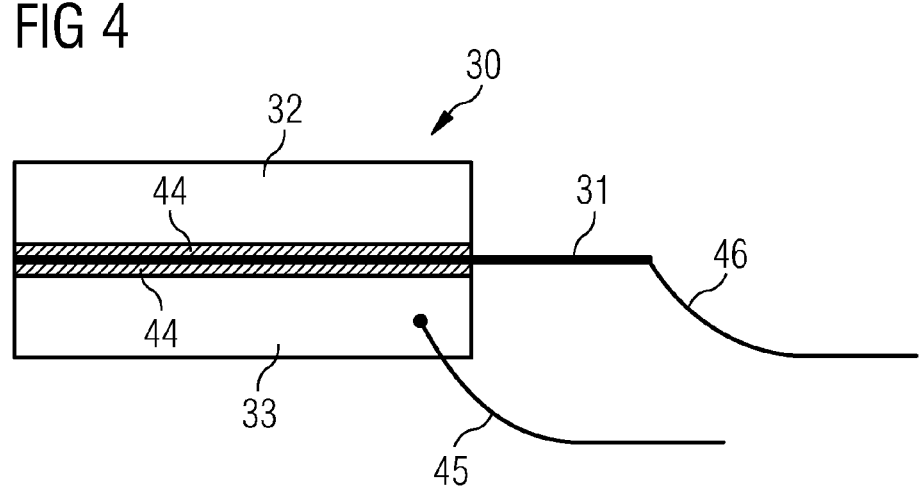
FIG. 4 shows a schematic section view of the configuration of the piezoresistive sensor from FIG. 2.

FIG. 4 shows a schematic section view of the design of the piezoresistive sensor shown in FIG. 3. As is shown in FIG. 4, the contact electrode 31 is located between the sensor disks 32, 33 like a sandwich. The piezoresistive layers 44, which are applied to the sensor disks 32, 33, touch the contact electrode 31. The contact electrode 31 has a foil-like structure. According to one preferred exemplary embodiment, the contact electrode 31 is a steel foil. An electrical resistance of the sensor 30 can be measured using the electrical connections 45 and 46.

In this case, in the configuration shown in FIG. 4, the resistance of the lower piezoresistive layer 44, which is applied to the sensor disk 33, is measured. If the connection 45 is fitted to the upper sensor disk 32, instead of to the lower sensor disk 33 as is shown in FIG. 4, it is possible to measure the resistance of the upper of the two layers 44.

According to yet another exemplary embodiment, there is no contact electrode 31 and the electrical connections are fitted to the upper and to the lower sensor disks 32, 33.

Figure 5:
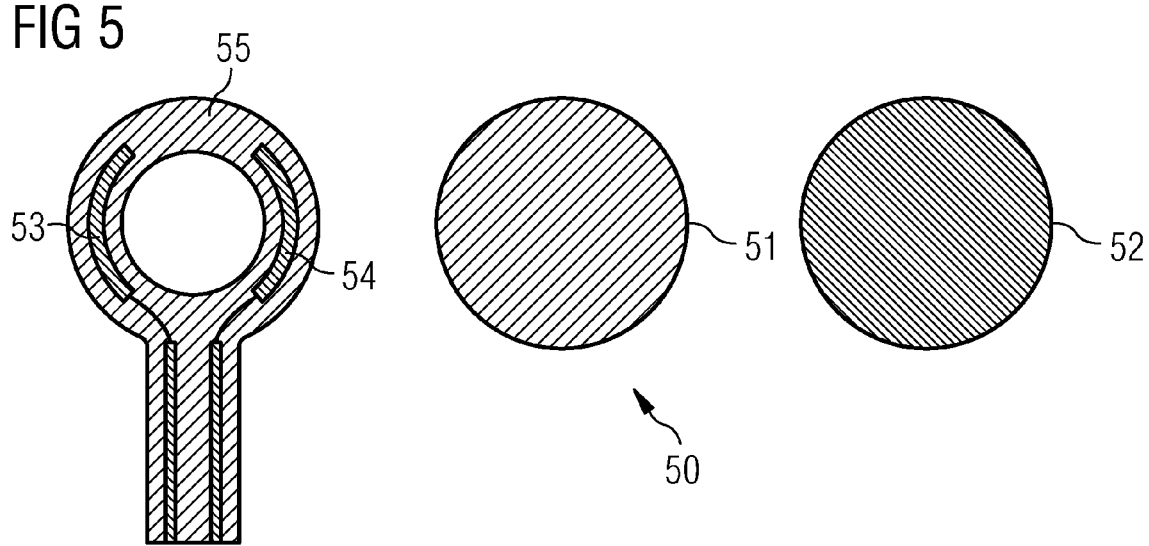
FIG. 5 shows a schematic view of components of a piezoresistive sensor from FIG. 2.

By way of example, FIG. 5 shows a schematic view of components of a piezoresistive sensor 50. The sensor 50 shown in FIG. 5 corresponds to the sensors 24 from FIG. 2, but, in contrast to the sensor 30 shown by way of example in FIG. 3, the sensor 50 has a coating of a material with a pressure-dependent electrical resistance only on one sensor disk 51 while, in contrast, the second sensor disk 52 is not provided with a piezoresistive layer such as this. Electrodes 53 and 54 are provided in order to make electrical contact with the piezoresistive layer, and are fitted on an electrode substrate 55. In contrast to the electrode 31 from the exemplary embodiment shown in FIGS. 3 and 4, the electrode substrate 55 is not manufactured from electrically conductive material, but from electrically insulating material. By way of example, the electrode substrate 55 is a polyamide film. The electrode structure of the sensor of the bearing device according to the invention is, however, not restricted to the electrode structure illustrated in FIG. 5, which has the electrodes 53 and 54. Instead of this, depending on the requirements, it is also possible to use different electrode geometries, for example in order to further optimize the accuracy of the measurement in terms of the position dependence.

Figure 6:
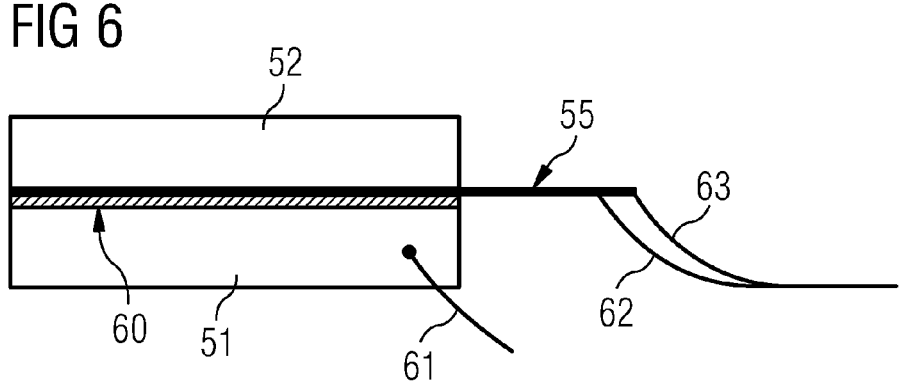
FIG. 6 shows a schematic section view of the configuration of the piezoresistive sensor from FIG. 2.

FIG. 6 shows a schematic section view of the configuration of the piezoresistive sensor from FIG. 5. As is shown in FIG. 6, the piezoresistive layer 60 which is applied to the sensor disk 51 and which in this exemplary embodiment is a DCL layer, is brought into contact with the electrode substrate 55. In this case, the electrodes 53, 54 face the piezoresistive layer 60, as can be seen from the arrangement illustrated in FIG. 6, in which the electrical connections 62, 63 lead away from the lower face of the electrode substrate and the electrodes. The sensor disk 51 is provided with an electrical connection 61, in order to allow the resistance of the piezoresistive layer 60 to be measured.

Figure 7:
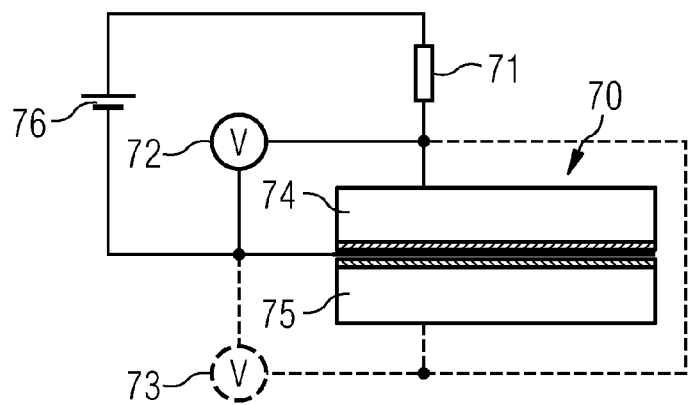
FIG. 7 shows a circuit diagram of an electrical circuit of a piezoresistive sensor according to one exemplary embodiment of the invention.

FIG. 7 shows the electrical circuitry of a piezoresistive sensor 70 according to one exemplary embodiment of the invention. The sensor 70 has two sensor plates 74, 75 which are coated with piezoresistive layers. The sensor plates 74, 75 or their piezoresistive layers make electrical contact with an electrode 76. The electrode 76 and the sensor plates 74 and 75 are electrically connected to one another, as in the arrangement shown in FIG. 7. The circuitry shown in FIG. 7 allows two alternative resistance measurements.

A first circuit, represented by solid lines, contains a voltage source U, a bias resistor or reference resistor 71, and a voltage measurement instrument 72. When the first circuit is closed, the voltage measurement instrument 72 can be used to determine the electrical resistance $R_{sensor}$ of the piezoresistive layer on the sensor plate 74 and the electrical resistance over the sensor plate 74 including the layer applied to it, using the following formula:

$$R_{sensor}=(U_{sensor}\cdot R_{ref})/(U_{SQ}-U_{sensor}),$$

where $U_{sensor}$ is the electrical voltage drop across the resistance layer of the upper sensor disk 74, $R_{ref}$ is the electrical resistance of the reference resistance 71, and $U_{SQ}$ is the electrical voltage provided by the voltage source 76.

In a second circuit, the electrical contact with the upper sensor disk 74 is interrupted (not shown in FIG. 7), with the circuit being closed by the circuit part shown by dashed lines in FIG. 7. With the above formula being used analogously, it is now possible to determine the resistance of the piezoelectric layer of the lower sensor plate 75, by means of the voltage measurement instrument 73. The accuracy of the measurements can be increased by measurement of the voltage drop across both the lower and the upper layer.

The invention claimed is:

1. A bearing device for bearing a shaft, comprising:
   a bearing;
   a supporting structure, with a stool plate for supporting the bearing; and
   a piezoresistive sensor which is fitted in an integrated manner into the stool plate and is arranged in a power flow area of the bearing device,
   wherein the electrical resistance of the piezoresistive sensor is influenced by the contact force of the bearing, which acts on the piezoresistive sensor, such that the contact force of the bearing is tapped off electrically at the piezoresistive sensor.

2. The bearing device as claimed in claim 1, wherein the piezoresistive sensor includes a piezoresistive thin layer.

3. The bearing device as claimed in claim 2, wherein the piezoresistive thin layer includes a layer of amorphous carbon.

4. The bearing device as claimed in claim 2,
   wherein the piezoresistive sensor includes a sensor plate or sensor disk, and
   wherein the piezoresistive thin layer is applied to the sensor plate or to the sensor disk.

5. The bearing device as claimed in claim 2, wherein the contact force is tapped off by means of a contact electrode which rests on the piezoresistive thin layer.

6. The bearing device as claimed in claim 1, wherein the temperature of the piezoresistive sensor is monitored.

7. A rotor system, comprising:
a rotor; and
a plurality of bearing devices for bearing the rotor shaft of the rotor, with the rotor shaft being borne in a statically over-defined manner, and
wherein at least one of the plurality of bearing devices is a bearing device as claimed in claim 1.

8. The rotor system as claimed in claim 7, wherein the piezoresistive sensor includes a piezoresistive thin layer.

9. The rotor system as claimed in claim 8, wherein the piezoresistive thin layer includes a layer of amorphous carbon.

10. The rotor system as claimed in claim 8,
wherein the piezoresistive sensor includes a sensor plate or sensor disk, and
wherein the piezoresistive thin layer is applied to the sensor plate or to the sensor disk.

11. The rotor system as claimed in claim 8, wherein the contact force is tapped off by means of a contact electrode which rests on the piezoresistive thin layer.

12. The rotor system as claimed in claim 7, wherein the temperature of the piezoresistive sensor is monitored.

13. A method for determination of the static and/or dynamic bearing contact forces of the shaft bearings of a shaft which is borne in a statically over-defined manner, and is borne by means of a bearing device, comprising:

tapping off the bearing contact force electrically using a piezoresistive sensor which is fitted in an integrated manner into the stool plate and is arranged in a power flow area of the bearing device; and incorporating the piezoresistive sensor such that it is integrated in a power flow area in the stool plate, wherein the bearing device is as claimed in claim 1.

14. The method as claimed in claim 13, wherein the method is used for a rotor system with shaft bearings, a rotor, and a rotor shaft for driving the rotor.

* * * * *